United States Patent [19]

Stewart et al.

[11] Patent Number: 5,157,780
[45] Date of Patent: Oct. 20, 1992

[54] MASTER-SLAVE CHECKING SYSTEM

[75] Inventors: Brett B. Stewart; David B. Witt, both of Austin, Tex.; Bo A. Molander, Enebyberg, Sweden

[73] Assignee: Advanced Micro Devices, Inc., Sunnyvale, Calif.

[21] Appl. No.: 536,884

[22] Filed: Jun. 12, 1990

[51] Int. Cl.$^5$ .............................................. G06F 11/16
[52] U.S. Cl. ........................................ 395/575; 371/3
[58] Field of Search .................. 371/3, 68.3, 68.1, 9.1; 364/185, 187

[56] References Cited

U.S. PATENT DOCUMENTS

| | | |
|---|---|---|
| 3,680,069 | 7/1972 | Neumann et al. ...................... 371/3 |
| 4,358,823 | 11/1982 | McDonald et al. ................. 371/9.1 |
| 4,574,343 | 3/1986 | Inatomi ............................... 364/185 |
| 4,759,019 | 7/1988 | Bentley et al. ........................ 371/3 |
| 4,792,955 | 12/1988 | Johnson et al. .................... 371/11.1 |
| 4,849,979 | 7/1989 | Maccianti et al. ................... 371/9.1 |
| 4,903,270 | 2/1990 | Johnson et al. ........................ 371/3 |

FOREIGN PATENT DOCUMENTS 0109944 6/1983 Japan ...................................... 371/3

Primary Examiner—Joseph L. Dixon
Assistant Examiner—Henry C. Lebowitz
Attorney, Agent, or Firm—Foley & Lardner

[57] ABSTRACT

The system comprises a pair of error checking processors connected in a master/slave configuration such that the slave receives inputs and outputs of the master, mimics operation of the master based on the inputs to produce mimicked outputs, compares the mimicked outputs with the master outputs and indicates an error condition if the mimicked outputs do not equal the master outputs. A checking circuit forces a difference between the mimicked output and the master output and determines if the master slave configuration accurately determines the presence of the forced error.

11 Claims, 3 Drawing Sheets

MASTER-SLAVE CHECKING SYSTEM

BACKGROUND OF THE INVENTION

1. Field of the Invention

This invention relates to fail-safe computer systems and particularly to such systems in which a slave computer or microprocessor monitors the operation or of a master computer or microprocessor and outputs an error condition signal when an error is detected.

2. Discussion of Related Art

It has become quite common to use redundant processors to provide a fail-safe mode of operation. The master processor executes programs and the slave processor mimics the operation of the master processor. The slave receives the same inputs as the master and has its output drivers disabled. The output pins of the slave are connected to the master's. By comparing the internally generated input to its output drivers to the outputs of the master processor, the slave performs a comprehensive check of the operation of the master processor. If a discrepancy is detected, an error signal is generated.

A master/slave combination can operate properly for years before an error condition is encountered. During this period, it would be desirable to determine if the master/slave configuration is performing its proper error monitoring function. However, presently, there is no known system or method for checking the error detecting operation of a master/slave combination within a simple master/slave checking system such as used in the AM 29000 microprocessor produced by Advanced Micro Devices of Sunnyvale, Calif., where the slave snoops the master output.

SUMMARY OF THE INVENTION

One object of the present invention is to provide a system whereby the proper operation of a master/slave combination can be determined.

Another object of the present invention is to provide a checking system for master/slave operation which can carry out its function without hindering the normal program execution carried out in a master/slave configuration.

A further object of the present invention is to provide a system for checking master/slave operation which system can be implemented using relatively few components in an expeditious and cost-effective manner.

In accordance with the above and other objects, the present invention comprises a pair of error checking processors connected in a master/slave configuration such that the slave receives inputs and outputs of the master, mimics the operation of the master based on the inputs to the master to produce mimicked outputs, compares the mimicked outputs with the master outputs and indicates an error condition if the mimicked outputs do not equal the master outputs. The invention also includes a checker for forcing a difference between the mimicked outputs and the master outputs.

In accordance with other aspects of the invention, the checker comprises an input for receiving data input to the master and passing the data to inputs of the slave. The checker selectively alters the data before passing it to the slave so that the inputs to the master and the slave differ.

The data alteration carried out by the checker can comprise alteration of a single bit of one data word. The single bit can be the least significant bit of the data word.

In accordance with further aspects of the invention, the system can include a program for shifting and masking to set the altered bit in the address, data, or control fields in order to test the system's response to errors occurring in different bit locations. The program can perform this test for response to errors at an arbitrary rate, say from once a day to many times per second.

The invention also includes the method of checking the operation of a master/slave processor system by forcing a difference between the outputs of the master and slave processors and detecting the error condition output of the master/slave configuration.

BRIEF DESCRIPTION OF THE DRAWINGS

The above and other objects of the present invention will become more readily understood when the invention is described in further detail below, reference being had to the accompanying drawings in which like reference numerals represent like parts throughout, and in which.

DETAILED DESCRIPTION OF THE PREFERRED EMBODIMENTS

Figure 1:
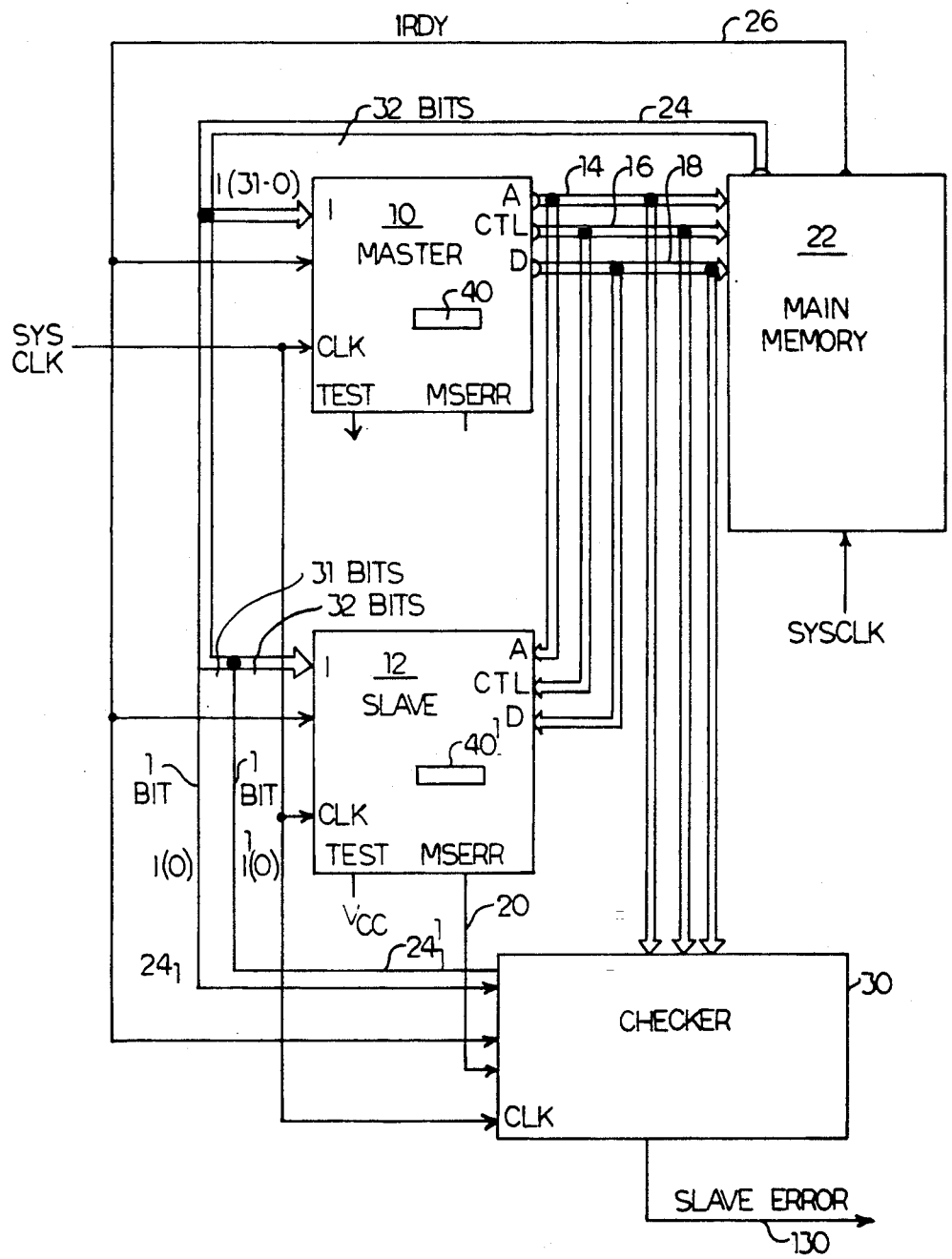
FIG. 1 is a block diagram of the master/slave system with the checker of the present invention.

With reference to FIG. 1, it will be seen that the system of the present invention comprises a master microprocessor 10, such as a model Am29000 32-bit Streamlined Instruction Processor produced by Advanced Micro Devices (AMD) of Sunnyvale, Calif. and a slave processor 12 which can also be an AMD Model Am29000. The master and slave processors are connected in a conventional manner with the test pin of the master processor grounded and the test pin of the slave processor connected to $V_{cc}$. In this configuration, the master executes program instructions and outputs data on its address bus 14, control bus 16, and data bus 18. Buses 14, 16, and 18 are connected to the address output A, the control output CTL, and the data output D of slave processor 12. Slave processor 12 mimics the master processor 10 by executing the same program steps to produce a mimicked output. However, the output drivers of the slave processor are disabled so that the mimicked output never appears on the slave output pins. The slave processor 12 compares its mimicked output with the master output. If a difference is noted, an error condition signal is asserted on master/slave error line 20.

The system also includes a main memory 22 which is connected to buses 14, 16, and 18 in a conventional manner. These buses provide address, control, and data field signals to the memory for accessing information in the memory. An accessed instruction is provided by memory 22 on instruction bus 24. At the same time, when an instruction request has been fulfilled by the memory 22, an instruction ready signal (IRDY) is output on instruction ready line 26 by the main memory.

This type of operation is conventional and will not be discussed in further detail.

In a conventional master/slave configuration, the instruction bus 24 is connected to the instruction input I of master microprocessor 10 and slave microprocessor 12. However, in accordance with the present invention, this connection is altered with respect to the slave microprocessor 12 only. In other words, the bus connections to master microprocessor 10 are made in a conventional manner but the connection to slave microprocessor 12 is not conventional.

In the AMD Am29000 microprocessor, 32 bit words are used. Therefore, the instruction bus 24 contains 32 bit lines. All of these are input to the master microprocessor 10. However, only 31 of the 32 bit lines in bus 24 are connected directly to slave microprocessor 12. The other bit line $24_1$ is connected to checker circuit 30. This bit line preferably carries the least significant bit of the word. This bit is selectively altered in checker circuit 30, as will be discussed below, and the altered bit is passed out on line $24'_1$ which is provided to slave processor 12 to make up a full 32 bit word.

In accordance with the invention, one global register of each of master processor 10 and slave processor 12 is set aside for use in checking the operation of the master/slave system. These global registers, indicated generally as GR1, are designated 40 and 40' in the master and slave microprocessors 10 and 12, respectively.

As discussed above, checker 30 functions to provide words to registers 40 and 40' which differ by one bit. This operation is carried out by the circuit shown in FIG. 2 which is incorporated in the checker 30. This circuit comprises a latch 42 which can be a conventional flip-flop. Latch 42 has an inverting output on line 43 connected to one input of AND gate 44. The other input of AND gate 44 receives line $24_1$ which has the least significant bit of bus 24. The output of AND gate 44 is on line $24'_1$ which comprises the least significant bit input to slave microprocessor 12.

In operation, during system initialization such as when the system is initially turned on, a reset signal is provided to all latches to place them in their initial states. This operation, which is conventional in microprocessor systems, causes a reset signal to appear on line 46, setting latch 42. This deasserts the output on line 43 disabling AND gate 44. This forces the output of gate 44 low regardless of the input on line $24_1$.

Figure 4:
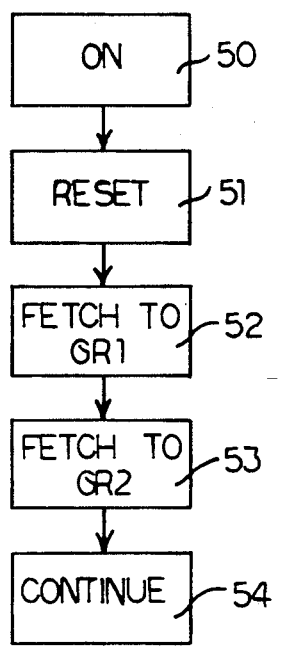
FIG. 4 is a flowchart of the token generation operation of the present invention.

The word stored in registers 40 and 40' is referred to as a checking token. The software for generating this token is depicted in the flowchart of FIG. 4. Step 50 indicates power being turned on to the system. Step 51 is a reset routine which causes the reset signal to be applied to all internal and external latches. This produces the signal on line 46 of FIG. 2. Step 52, the first program step after initialization, commands an instruction fetch from main memory 22 to the first predetermined global register GR1. This instruction fetch accesses a 32 bit register in memory 22 containing a 1 as the least significant bit. The fetched constant is transferred through bus 24 to master microprocessor 10 and is written into the predetermined global register, which is register 40 in the master processor. This microprocessor then contains the correct token value. All bits except the least significant bit of bus 24 are written into the corresponding global register 40' of microprocessor 12. The least significant bit received by microprocessor 12, however, is a zero on line $24_1'$ thereby assuring a one bit difference between the values in register 40 and 40'.

Figure 2:
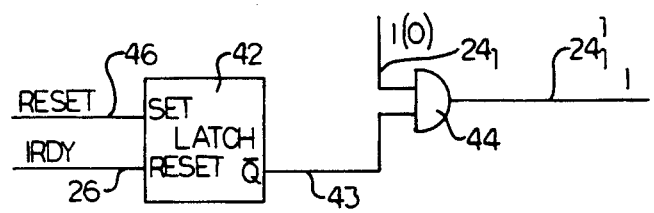
FIG. 2 is a block diagram of the data altering circuit of the checker of the present invention.

After the fetched value is made available by main memory 22, a signal is asserted on line 26 to microprocessors 10 and 12 indicating that the instruction fetch has been completed. As shown in FIG. 2, this signal resets latch 42 to provide a high signal on the inverting output of line 43. This enables gate 44 to pass whatever value is received on line $24_1$. Thus, any future instruction fetches will result in the same values being applied to master microprocessor 10 and slave microprocessor 12.

As further shown in FIG. 4, instruction 53, which follows the resetting of latch 42, commands the same instruction fetch, but to a different global register GR2. Thus, both processors have one register containing the correct fetched value, for reasons to be discussed. The microprocessors continue to execute program steps as shown in step 54 of FIG. 4.

Figure 3:
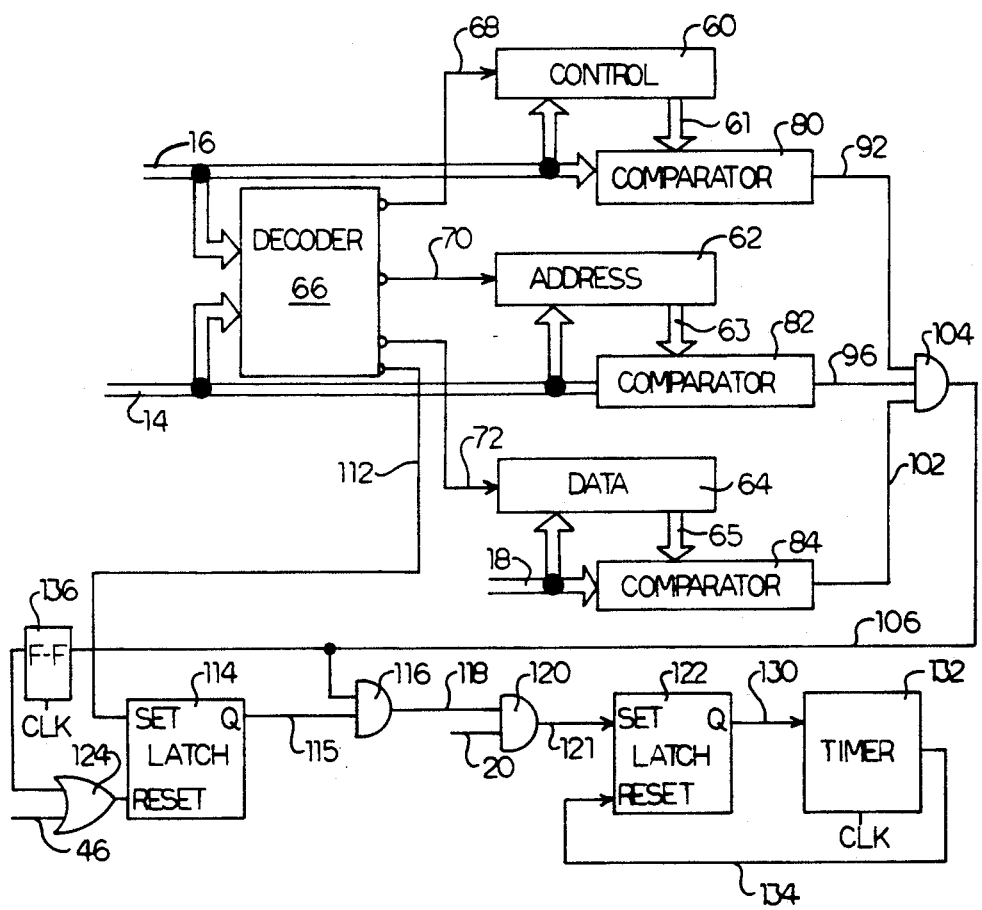
FIG. 3 is a block diagram of the monitoring circuit of the checker of the present invention.

FIG. 3 shows a block diagram of the portion of the checker circuit 30 used to confirm the proper operation of the master/slave combination. This circuit includes a control field register 60, an address field register 62 and a data field register 64 connected, respectively, to the control bus 16, address bus 14, and data bus 18. A conventional decoder 66 is also connected to the control bus 16 and address bus 14. A first output 68 from the decoder connects to a read/write input of the control field register 60, a second output line 70 connects to a read/write input of the address field register 62 and a third output 72 connects to a read/write input of data field register 64. When an output is asserted on a line 68, 70, or 72 the associated register is placed in a write condition to accept data. Otherwise, the associated register is in a read condition, making its contents available on its output 61, 63 or 65.

Decoder 66 is under program control of the master slave combination. It is used to load the registers 60, 62 and 64 with the control, address and data field of the token to be used in checking the master slave operation, as discussed below.

Comparators 80, 82, and 84 are associated, respectively, with the control field register 60, address field register 62, and data field register 64. Each comparator receives one input from the associated register and another input from one of the buses 16, 14, and 18. For example, comparator 80 receives an input on line 61 from the control field register 60 and another input from the control bus 16 to compare words on each of these inputs. If the comparison indicates a match, an output is asserted on line 92. In like manner, if comparator 82 finds a match between an input on line 63 from address field register 62 and address bus 14, an output is asserted on line 96. Finally, a similar operation is performed by comparator 84 which compares inputs on line 65 and bus 18 to assert an output on line 102. Lines 92, 96, and 102 are connected to inputs of an AND gate 104 which asserts an output on line 106 when a complete match of all fields is indicated. A complete match of this nature indicates the master slave checking token is being output on busses 16, 14, and 18.

A fourth output of decoder 66 asserts a signal on a line 112 in response to an input commanding a checker enable condition. This checker enable condition will be commanded after registers 60, 62 and 64 are loaded. Line 112 is connected to the set input of a latch 114 whose non-inverting output is connected to an input of AND gate 116 through line 115. The other input to AND gate 116 is line 106. The output of AND gate 116 is taken on line 118 to AND gate 120. This output indicates that a forced error should be sensed by the slave processor. The other input to gate 120 is the master/slave error indicator line 20 from slave microprocessor 112. Gate 120 asserts an output on line 121 whenever a forced error is properly detected by the slave processor.

The signal on line 121 may be provided to the set input of a latch 122 where it is held for further processing. Latch 122, therefore, asserts an output on line 130 whenever the slave processor has properly detected a forced error. This output is provided to a circuit 132 which may process the signal on line 130 and sound an alarm if a forced error is not properly detected. Upon each occurrence of a properly detected forced error, circuit 132 will reset latch 122 through line 134.

Line 106 is also connected to a delay flip-flop 136 which delays the signal on line 106 by one clock cycle. The delayed signal is passed to one input of an OR gate 124 whose other input is connected to reset line 46. The output of gate 124 is connected to the reset input of latch 114. Thus, latch 114 will be reset upon initialization of the system as well as one clock cycle after a match is sensed by AND gate 104.

In operation, the software being run in the microprocessors accesses the registers 60, 62, and 64 by conventional means through address and control buses 14 and 16 and decoder 66. The accessed registers are loaded with the control, address and data fields on which the checker token is to be output. Subsequently a checker enable condition is commanded causing a signal to be asserted on line 112 which sets latch 114 to enable a checking operation. The output of latch 114 enables gate 116 to pass any signals on line 106 when they occur.

Subsequent to loading the register 60, 62, and 64, and commanding a checker enable condition, the program externalizes the word in register 40 through the appropriate control, address, and data fields previously stored in registers 60, 62 and 64. When the token appears on busses 16, 14, and 18, a match is indicated on lines 92, 96 and 102, causing an output on line 106 from gate 104. An output of gate 104, therefore, indicates that the token has been externalized and that the slave processor should be sensing and indicating an error.

The output on line 106 is passed by gate 116 to gate 120 which also receives the error condition output signal on line 20. If the slave has properly detected the mismatch between its mimicked output and the master output, a signal will be asserted on line 20 causing an output on line 121. This output indicates proper operation of the master/slave combination.

The output on line 121 can be monitored by any convenient system, such as by setting latch 122 and causing a signal on line 130 to be passed to circuit 132 to indicate proper operation. Subsequently, circuit 132 will reset latch 122 when it has processed the received signal. Circuit 132 may, for example, initiate a checking sequence by sending an interrupt signal to the processors 10 and 12 at predetermined periods and then indicate an error if no response is received on line 130 within another predetermined period. Such a circuit could be implemented by a timer which is restarted at predetermined periods by a signal which is sent to the master slave/combination as an interrupt, sets an alarm when it times out and is reset by the signal on line 130 to reset latch 122.

Figure 5:
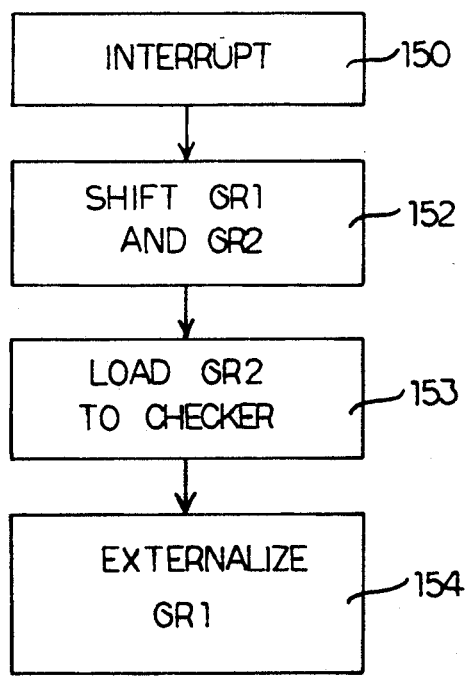
FIG. 5 is a flowchart of the checking operation of the present invention.

FIG. 5 shows a flowchart of the program enabling the system to check the operation of the master/slave configuration for all output bits. Step 150 indicates an interrupt which begins operation of the checking program. This interrupt can be applied on a periodic basis, for example, once every 5 milliseconds by circuit 132. It will be remembered that at this point, the system has been turned on so that the program of FIG. 4 has already been run and the token is stored in registers 40 and 40' with a one bit deviation. Step 152 of the program of FIG. 5 produces a shift and/or mask operation to move that one bit to a new bit location such that each time the program of FIG. 5 is run, a comparison will be made with the incorrect bit in a different location. This results in the incorrect bit appearing at each output pin during different executions of the program. Step 153 then loads the contents of the second global register to the checker. As will be recalled, the second global register contains the correct representation of the token in both the master and slave processors. This enables the token to be loaded into the checker registers without causing an error condition output in the slave processor. As part of step 153, the checker enable condition as comanded after all registers in the checker circuit 30 are loaded. In step 154, the token in register GR1 is externalized by an appropriate load, jump or other instruction requiring the token to appear on the output pins of the master. This should cause an error condition to be detected by the slave. If not, the checker 30 will produce an appropriate response in the form of an alarm or other error condition signal.

The foregoing description is intended to illustrate the present invention but is not intended to limit the scope of protection being sought. Clearly, numerous additions, changes, substitutions and the like could be made to this preferred embodiment without departing from the scope of the invention as set forth in the appended claims. For example, the least significant bit could simply be inverted rather than forced to zero, or the entire token passed to slave 12 could be inverted from that passed to master 10 and multiple checkers could be provided to perform a bit-by-bit analysis to indicate the status of all output pins at one time.

What is claimed is:

1. A system, comprising:
   a pair of error checking processors connected in a master/slave configuration such that the slave receives inputs and outputs of the master, mimics operation of the master based on said inputs to produce mimicked outputs, compares said mimicked outputs with said master outputs and indicates an error condition if said mimicked outputs do not equal said master outputs; and
   checking means for forcing a difference between a mimicked output and a master output to check the operation of said processors, wherein said checking means comprises:
   input means for receiving data input to said master and passing said data to an input of said slave;
   data alteration means for selectively altering said data before passing it to said slave so that the data input to said master and slave differ; and
   means for outputting said receiving data as said outputs of said master.

2. A system as claimed in claim 1 wherein said data alteration means alters one bit of said data.

3. A system as claimed in claim 2 wherein said one bit is a least significant bit.

4. A system as claimed in claim 1 wherein said checking means comprises a circuit for monitoring said error condition.

5. A system as claimed in claim 1 wherein said checking means comprises a circuit having a control field register, an address field register and a data field register to store expected outputs of said master processor.

6. A system as claimed in claim 5 wherein said circuit includes comparators for comparing contents of said control field, address field and data field registers with outputs of said master processor and indicating a match.

7. A system as claimed in claim 6 wherein said circuit includes means responsive to said comparators indicating a match for sensing a state of a master slave error output of said slave processor and indicating proper operation if said master slave error output indicates an error.

8. A system as claimed in claim 5 including means for selectively causing said difference between a master output and a mimicked output to appear on a control field output, an address field output and a data field output.

9. A system as claimed in claim 8 wherein said data alteration means alters one bit and including means for shifting the position of said one bit to selectively cause said difference to appear one bit at a time in said control field output, said address field output and said data field output.

10. A method, comprising:
    operating a pair of error checking processors in a master/slave configuration such that the slave receives inputs and outputs of the master, mimics operation of the master based on said inputs to produce mimicked outputs, compares said mimicked outputs with said master outputs and indicates an error condition if said mimicked outputs do not equal said master outputs;
    receiving data input to said master;
    selectively altering said data before passing it to an input of said slave so that the data input to said master and slave differ; and
    outputting said received data as said outputs of said master so as to check operation of said processors.

11. A method as claimed in claim 10 wherein said step of altering comprises altering one bit of said data.

* * * * *